United States Patent [19]

Kägi

[11] Patent Number: 4,510,845
[45] Date of Patent: Apr. 16, 1985

[54] PRESSURE-MEDIUM-DRIVEN LINEAR DRIVING ARRANGEMENT

[75] Inventor: Bruno Kägi, Meilen, Switzerland

[73] Assignee: Bachofen AG, Uster, Switzerland

[21] Appl. No.: 383,162

[22] Filed: May 28, 1982

[30] Foreign Application Priority Data

Jun. 18, 1981 [CH] Switzerland .................. 4025/81

[51] Int. Cl.³ ............................................. F01L 33/02
[52] U.S. Cl. ...................................... 91/180; 91/176; 91/183
[58] Field of Search ................... 91/178, 183, 180, 176

[56] References Cited

U.S. PATENT DOCUMENTS

| 912,183 | 2/1909 | Scollard | 91/180 |
|---|---|---|---|
| 1,115,470 | 10/1914 | Lipman | 91/180 |
| 3,424,059 | 1/1969 | Conner et al. | 91/183 |
| 3,468,175 | 9/1969 | Rabek | 74/63 |
| 3,603,211 | 9/1971 | Firth | 91/180 |
| 3,621,760 | 11/1971 | Goode | 91/481 |
| 4,211,147 | 7/1980 | Panissidi et al. | 91/184 |

FOREIGN PATENT DOCUMENTS

| 2219996 | 11/1973 | Fed. Rep. of Germany . | |
|---|---|---|---|
| 2363143 | 7/1974 | Fed. Rep. of Germany | 91/183 |
| 2359779 | 6/1979 | Fed. Rep. of Germany . | |
| 1209306 | 10/1970 | United Kingdom | 91/183 |
| 1398012 | 6/1975 | United Kingdom . | |

OTHER PUBLICATIONS

Design Engineering, vol. 51, No. 6, Jun. 1980, pp. 35–37, London, Great Britain: F. Yeaple, *Cylinders, motors and actuators*, p. 35, FIG. 3.

Primary Examiner—Paul E. Maslousky
Attorney, Agent, or Firm—Karl F. Ross; Herbert Dubno

[57] ABSTRACT

A pressure-medium-driven linear driving arrangement comprises a slide-shaped driving unit supported on a feed rack with a sliding curve. The driving unit comprising step-by-step elements in the form of piston-cylinder systems, which are controlled by a pressure medium via a rotary slide valve to produce a relative motion between the driving unit and the feed rack. The step-by-step elements each have a pivoted lever joined on one hand to the piston of the step-by-step element and on the other hand, joined to the slide housing, constituting self-centering feeding link driving elements.

7 Claims, 5 Drawing Figures

PRESSURE-MEDIUM-DRIVEN LINEAR DRIVING ARRANGEMENT

FIELD OF THE INVENTION

The present invention relates to a pressure-medium-operated linear driving arrangement for producing a relative displacement between a driving unit in the form of a slide and a feed rack with a sliding curve, whereby the driving unit comprises a plurality of pressure-medium-operable step-by-step elements forming a piston-cylinder-system to which the pistons are supported on the profile of the feed rack, the cylinders of which, each are controlled by valve means, being connected with the pressure medium source.

BACKGROUND OF THE INVENTION

Linear drive arrangements of this type have been disclosed in the W. German published application No. 2 359 779 or the British Pat. No. 1 398 012. In these publications, the construction and means of function of such linear drives are in the main theoretically treated without giving closer reference to possible practicable embodiment. In these publications, for example, it is proposed that a piston-cylinder-system of conventional construction is to be used, which, because of the high shearing forces, is practicably hardly workable. Just as little information is to be found in these publications concerning the range of applications of such linear driving arrangements, because the linear driving arrangements in these publications are restricted to the drive of machine-tool slides.

OBJECT OF THE INVENTION

It is a primary object of the present invention to provide a new and improved construction of a pressure-medium-driven linear driving arrangement which can meet all practicable requirements and which permits a wide range of applications.

SUMMARY OF THE INVENTION

The pressure-medium-driven linear driving arrangement of the present development is manifested by the features that the step-by-step elements, each having a pivoted lever being joined on the one hand to the piston of the step-by-step element, and on the other hand being joined to the slide housing, constituting self-centering feeding link driving elements.

It is advantageous if the piston-cylinder-system comprises air spring bellows with a piston member, or roller diaphragms with loosely laid on piston members set in the cylinders and situated in rows, respectively, supported on the base of the slide housing, whereby ducts of the piston-cylinder-system are connected to the control valve device which is likewise secured to the slide housing.

Accordingly, then, each free piston end supports an interacting roller component, that works together with the cam profile of the feed rack, and is connected with one end of the rocking lever, the other end of which is rotatably connected to the slide housing.

Furthermore, the slide housing should be supported by counterrollers on the flat side of the feed rack.

In addition, it is advantageous if the control valve means comprises a rotary slide valve, controlled by a pinion, or by a feeler roller rolling on the feed rack with a sliding curve or cam.

This arrangement, according to the invention provides a compact and relatively simple linear driving arrangement which, due to the specific construction of the piston-cylinder-system feeding link driving elements, is capable of absorbing without impediment all ensuing shearing forces, giving the most optimum feeding power with lowest pressure requirements. As a result of this, the pressure media can be air, water, oil or the like.

As this driving arrangement is capable of producing great feeding power, even when being of the smallest size, it can be used according to the invention as a means by which gates, hangar doors, sluices etc. can be opened and closed. It can here be seen by way of comparison, that the advantages of this driving mechanism according to the invention, over electromotors with chain drive etc., as have been used until now in this field, include the substantial simplification of the construction conception, the great reduction in weight (up to two thirds that of conventional motors), and the considerable reduction in the cost. This driving arrangement is, therefore, suitable for industrial as well as private purposes; and may be used in every orientation to the vertical.

In reverse, the driving arrangement according to the invention may also be used as a trolly, a transport slide, a distributor etc.

BRIEF DESCRIPTION OF THE DRAWING

The invention will be better understood and objects other than those set forth above, will become apparent when consideration is given to the following detailed description thereof. This description makes reference to the annexed drawing wherein.

SPECIFIC DESCRIPTION

Figure 1:
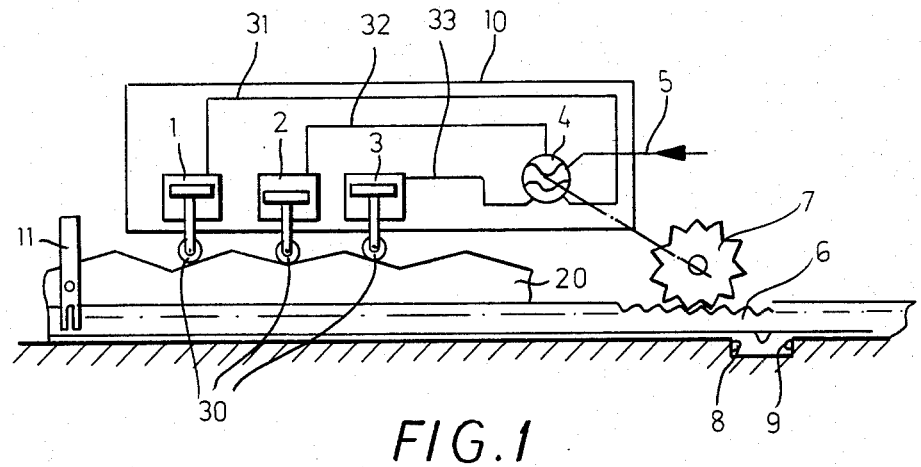
FIG. 1 is a diagrammatic representation according to the invention, of the pressure-medium-driven linear driving arrangement.
Figure 2:
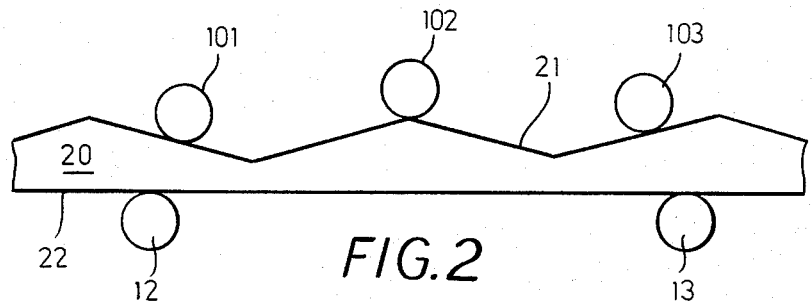
FIG. 2 is a diagram to illustrate the generation of the linear movement.

With the aid of FIGS. 1 and 2 the operational principles of the pressure-medium-driven linear driving arrangement according to invention can be seen.

The arrangement according to FIG. 1 shows three step-by-step (stepping) elements 1, 2 and 3 in the form of a pressure-means-driven piston-cylinder-system positioned on a driving unit 10 in the form of a slide. These step-by-step elements 1, 2 and 3 are controlled by an ordinary rotary distributing valve 4 to be operated in succession by pressure supplied through a supply line 5, and have rollers engaging a feed rack 20 with a sliding curve or cam. The rotary valve 4 is rotated in turn by the relative movement between the driving unit 10 and the feed rack 20 along a tooth rack 6 parallel to the feed rack 20 (cam rack) and with which a pinion 7 of the rotary slide valve 4 meshes.

The rack 6 is fixed within limits defined by abutments 8 and 9. The unit 10 moves along this rack. The fluid discharge from the cylinders 1, 2, 3 has not been illustrated. Pinion 7 is carried by the unit 10 and, as the latter moves, rotates by reason of its engagement with the rack.

The movement direction of the movement between the driving unit 10 and the feed rack 20 is determined in the usual way by the generating angle of the cam and the position of the rotary valve, whereby the forward and backward motion is achieved either by reversing the inlet or outlet of the pressure medium, or by changing the relative angle position of the rotary slide valve against the cam rack. The latter can also be achieved by displacing the tooth rack 6. The idle position of the driving arrangement is shown in FIG. 1. Through a displacing of the tooth rack 6 to the stop 8 or 9 (by the control lever 11), the valve 4 is rotated in the one or the other sense to connect the pressure-medium unit 1 or 3 to the source 5. The fluid pressure then drives the roller 30 of this unit downwardly to linearly shift the driving unit 10 (e.g. to the left in the case of pressurization of unit 1). The pinion 7 rolls along rack 6 to rotate the valve 4 and then connect the unit 2 to the pressure line 5. Then the unit 3 is so connected and the cycle repeats. When unit 3 is first connected to the pressure line the driving unit 10 is driven in the opposite direction. The nonpressurized unit 1-3 is relieved in the usual manner.

An equivalently analogous construction of an electrical type can also be produced using magnets and rotary switches. With an electrically operated or controlled type model, there is the possibility of replacing the rotary slide valve and the cogwheel coupling by direct-contact sliding contacts, whereby the decks run parallel to the feed rack, forming a linear collector. Furthermore, a digital control using punched tape, or parallel control by means of remote-control signals etc. is also possible.

To summarize this operation, note that if the handle 11 is shifted to move the rack to the right until the rack 6 engages the stop 9, the pinion 7 will be rotated in the counterclockwise sense and will connect the source 5 of the pressure medium to the line 33 on unit 3. The unit 3, because of the orientation of the ramp engaged by its roller 30, will displace the support 10 to the right causing the pinion 7 to rotate in the clockwise sense relative to the support and then connect the units 2, 1, 3, 2, 1 . . . in succession to the source to continue the driving operation, the nonpressurized unit 1-3 being vented. Obviously, if initially the handle 11 displaces the rack to move to the left, the pinion 7 will be rotated in the clockwise sense from the position shown and the first unit to be pressurized will be unit 1 and the succession of pressurization will be 1, 2, 3, 1, 2, 3 . . . .

FIG. 2 shows in diagrammatic representation rollers 101, 102 and 103, with which the aforenamed step-by-step feed rack 20; in this embodiment the rack 20 is the drive element and unit 10 can be stationary. Hence, counter feed rack 20; in this embodiment the rack 20 is the drive element and member 10 can be stationary. Hence, counter rollers or support rollers 12 and 13 bear against the plane surface 22 of the feed rack 20. The spacing of the formations of the cam of the feed rack 20, as well as the steepness of the curves of the profiles 21, can be varied and so constructed that in every operational phase, or relative position between the driving unit 10 and the feed rack 20, one of the above mentioned rollers is to be found on one of the slopes of the feed rack profiles, so that a relative displacement between the driving unit 10 and the feed rack 20 can be produced in the one as well as the other direction.

At this point, it is to be mentioned, that, within the limits of the invention, it is possible to provide arrangements of two or more than three stepping elements. Furthermore, an independent supply with which the pressure agent is conveyed over a trailing supply line to the receiving stations, or a self-supply by having respective pressure agent reservoirs, can be used.

Figure 3:
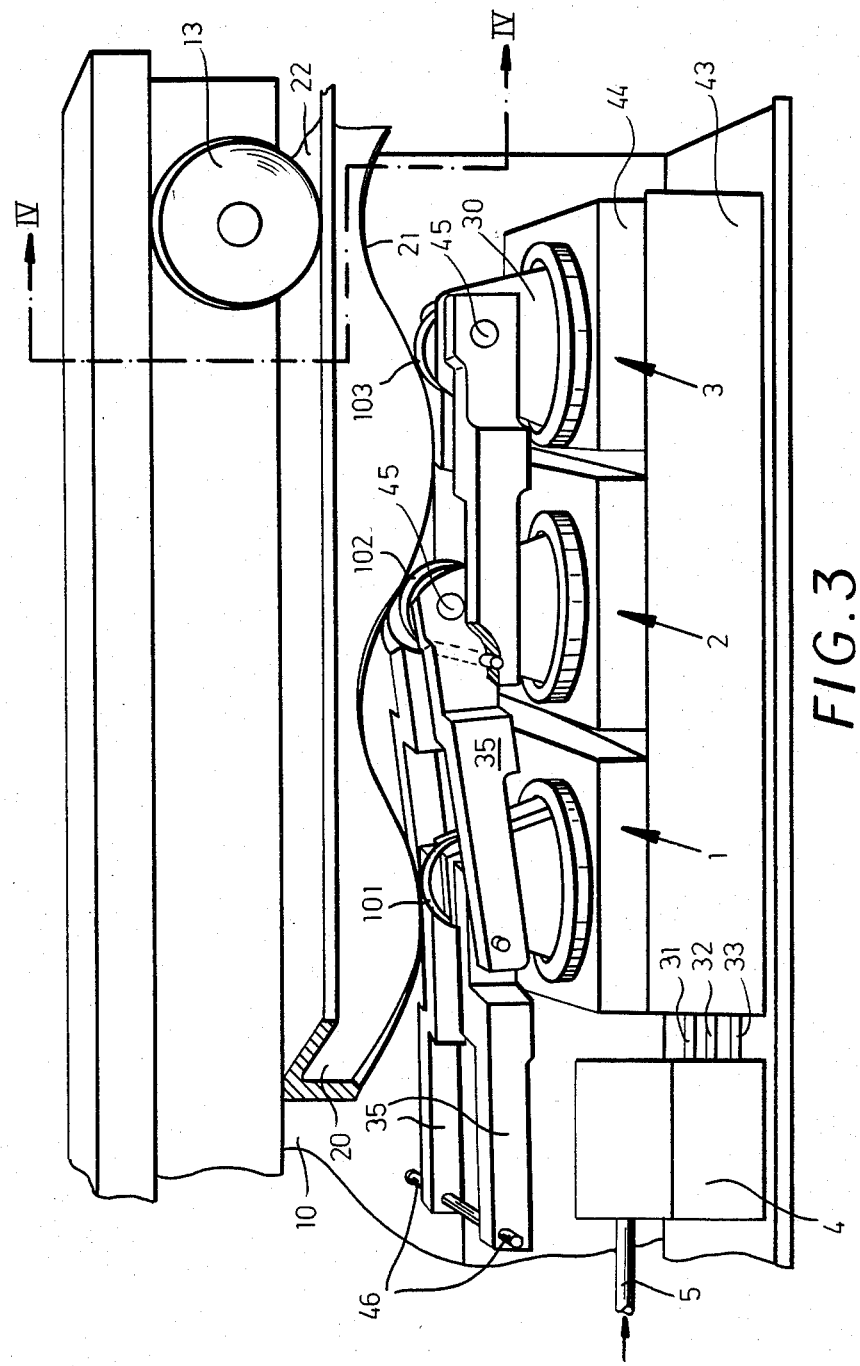
FIG. 3 shows a practical embodiment in a side view.
Figure 4:
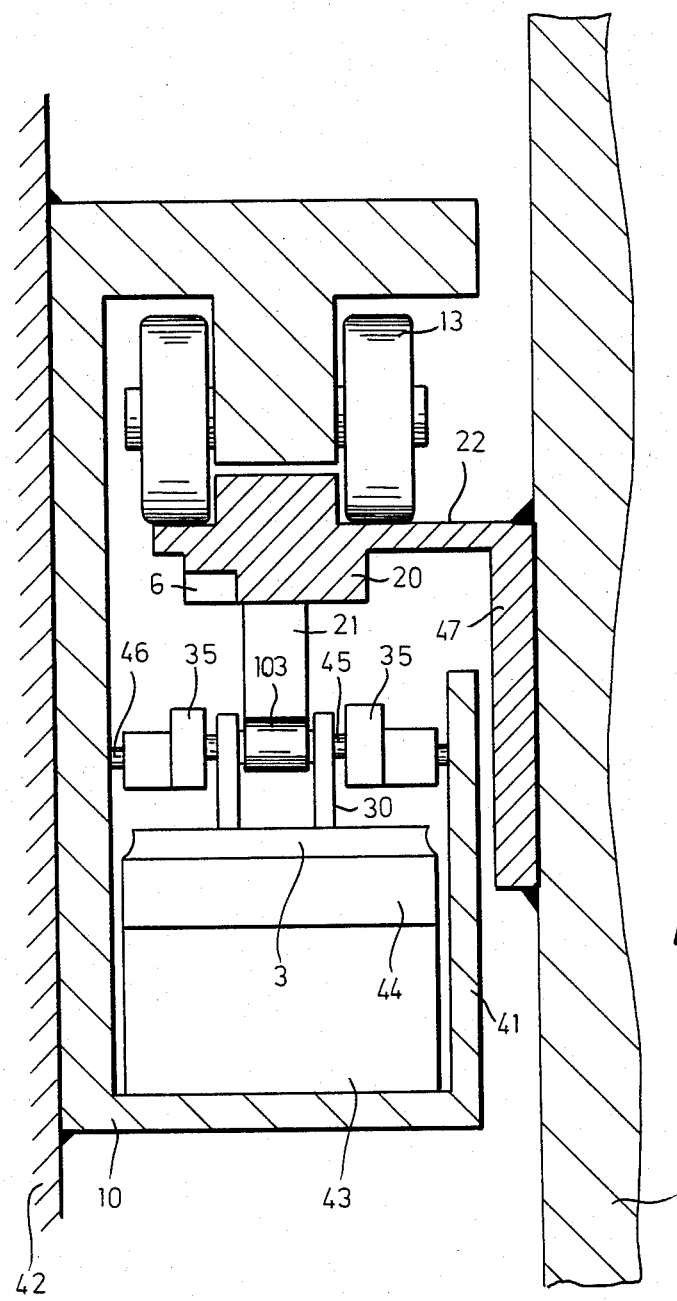
FIG. 4 is a section taken along the line IV—IV in FIG. 3 on a larger scale.

With the aid of FIGS. 3 and 4, a practicable constructional example is illustrated. In FIG. 3 the wall plate 41 (FIG. 4) has been removed so that the stepping elements 1, 2 and 3 as well as the rocking levers 35 can be seen.

In the example of application to be illustrated, the slide-shaped driving unit with its slide housing unit 10, is arranged fixed to the wall 42, a frame or the like, as a rule being screwed on, and serving here for the to-and-fro movement of a gate 100 or the like to which the feed rack 20 with its cam is affixed by an angular bracket 47 (FIG. 4). The moveable objects are, of course, as a rule guided in sliding frames.

The lever 35 on the left hand side of FIG. 3 is pivotally connected at 46 to the support forming part of slide housing unit 10 and to the piston 1. The next lever 25 pivoted to the first mentioned lever 35 and to the piston 2. The right hand lever 35 is pivoted to the second lever 35 and to piston 3.

The three piston-cylinder-systems 1,2 and 3 are arranged in a row, on the base of the slide housing 10, whereby their cylinder parts are combined in a block 43. In the cylinder bores (here not visible), is placed a so-called roller diaphragm being firmly fixed by the cover-plate 44. Roller diaphragms and their functions are commonly known, and do not have to be illustrated here. On these roller diaphragms sit respectively the appropriate piston element 30 having a large diametrical clearance and projecting with the free, forked end out of the block 43. As previously illustrated, every piston-cylinder-system 1,2 and 3 is in flow connection with the rotary valve 4 by one of the supply lines 31, 32, 33. The pinion of the rotary slide valve (not illustrated) meshes with the tooth rack 6 (FIG. 4) parallel to the driving rack 20, in the aforesaid manner.

Each piston-cylinder-system 1,2 and 3 is, owing to the virtue of the roller diaphragm, capable of absorbing and compensating all shearing force resulting from deviations in the lifting direction. To attain a self-centering of the system, a rocking lever 35, a pair of rocking levers, or a forked rocking lever, being pivoted by a pin 45, grips the free end of each piston 30. Here, pairs of rocking levers are provided being pivoted at their other ends with pins 46 to the wall plates of the slide housing 10.

In addition, a roller 101, 102, 103 rotatable on the pin 45 is, in each case, rotatable in the forked end of the respective piston 30. These rollers being supported on the cam track 21 of the feed rack 20. The pair of rollers 13 serve as a countersupport being rotatably pivoted on the slide housing 10, and which roll on the plane side 22 of the feed rack.

From the foregoing description and with the aid of FIGS. 3 and 4, a sturdy, simple and functionally reliable pressure-medium-driven linear driving arrangement is shown having every requirement of low weight, low price, high output capacity, being maintenance-free and having the greatest range of applications. The distinguishing features characterizing this invention lie in the self-centering feeding link driving elements being capable of producing the greatest feeding power with the lowest pressure requirements. Depending on the requirement and the size of the arrangement, it is possible to substitute the previously described piston-cylinder-system for so-called air spring bellows of a common commercial type, the feeding of which taking place at the base, whereby the pistonhead is attached to the rocking lever 35.

Figure 1A:
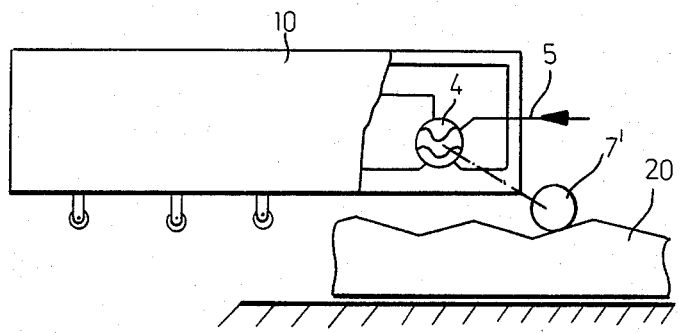
FIG. 1A is a diagram of another embodiment of the device of FIG. 1.

Moreover, it is easily possible to control the rotary slide valve 4, in accordance with FIG. 1A, by a feeler roller 7' rolling directly on the feed rack 20, in which case the parallel tooth rack 6 and the pinion wheel 7 (FIG. 1) could be dispensed with.

Here the support member (10) is formed with a row of pressure units (1, 2, 3), each of which has a displaceable piston and a pressurizable cylinder. The rack member (20) is formed with a cammed profile which is such that the members are relatively displaceable linearly parallel to the rack member upon step-by-step pressurization of the cylinder and the actions of the pistons thereof in succession upon the cammed profile. Valve means (4) is responsive to the relative displacement of the members (10, 20) for successively pressurizing a cylinder to effect step-by-step actuation of the pistons and, according to the invention, a first lever (extreme left in FIG. 3) is pivoted (at 46) to the support (10) while at least one further lever (35) is pivotally connected to this first lever and to another of the pistons to produce the self-centering device of the invention which completely takes up the shear forces.

While there are shown and described present preferred embodiments of the invention, it is to be distinctly understood that the invention is not limited thereto, but may be otherwise variously embodied and practiced within the scope of the following claims.

What I claim is:

1. A linear drive apparatus comprising:
   a support member formed with a row of pressure units each having a displaceable piston and a pressurizable cylinder cooperating with the respective piston;
   a rack member formed with a cam profile, said pistons being braced against said profile at respective points of attack along said row, said members being relatively displaceable linearly parallel to said rack member upon step-by-step pressurization of said cylinders and the actions of the pistons thereof in succession upon said cam profile;
   valve means responsive to the relative displacement of said members for successively pressurizing said cylinders with a pressure medium to effect a step-by-step actuation of said pistons; and
   a first lever pivotally connected to said support and to one of said pistons, and at least one further lever pivotally connected both to said first lever and to another of said pistons for self-centering points of attack of said piston upon said cam profile.

2. The linear drive apparatus defined in claim 1 wherein each of said pistons is provided with a roller bearing against said profile and forming the respective point of attack of the respective piston on said profile, said rollers each being journaled on pivot axes corresponding to the pivot of a respective one of said levers to the respective piston.

3. The linear drive apparatus defined in claim 2, further comprising counterrollers engaging a side of said rack opposite that provided with said profile, a side of said rack engaging said counterrollers being flat.

4. The linear drive apparatus defined in claim 2 wherein said valve means is a rotary valve provided with a pinion meshing with a toothed rack.

5. The linear drive apparatus defined in claim 4, further comprising means for shifting said toothed rack relative to the rack member provided with said cam profile.

6. The linear drive apparatus defined in claim 2 wherein said valve means includes a rotary valve provided with a follower roller engaging a cam profile of said rack.

7. The linear drive apparatus defined in claim 2 wherein said rack member is movable and said support member is stationary.

* * * * *